United States Patent [19]
Mott et al.

[11] 3,967,437
[45] July 6, 1976

[54] INDICATOR FOR A HARVESTING PLATFORM

[75] Inventors: Roger Eugene Mott, Bettendorf; Jerry Gary Barnett, Davenport, both of Iowa

[73] Assignee: Deere & Company, Moline, Ill.

[22] Filed: June 13, 1975

[21] Appl. No.: 586,565

[52] U.S. Cl. .................................. 56/10.2; 56/208; 116/124 R
[51] Int. Cl.² ...................... A01D 67/00; G09F 9/00
[58] Field of Search ..................... 116/124 R, 124 F; 56/208, 10.2, 10.4, DIG. 15, DIG. 16

[56] References Cited
UNITED STATES PATENTS

| | | | |
|---|---|---|---|
| 2,915,870 | 12/1959 | Hume | 56/208 |
| 3,286,448 | 11/1966 | Moore | 56/DIG. 15 |
| 3,349,747 | 10/1967 | Vande Wiele | 116/124 R |
| 3,392,697 | 7/1968 | Parrish et al. | 116/124 R |
| 3,398,516 | 8/1968 | Quick | 116/124 R X |
| 3,605,391 | 9/1971 | Schott et al. | 56/DIG. 15 X |
| 3,678,885 | 7/1972 | Ferguson | 116/124 R |
| 3,851,451 | 12/1974 | Agness et al. | 56/10.2 |

Primary Examiner—Herbert Goldstein
Assistant Examiner—Daniel M. Yasich

[57] ABSTRACT

A self-propelled combine has a forward, vertically adjustable feeder house carrying a transversely elongated harvesting platform at its forward end. A flexible cutter bar is mounted on the leading lower edge of the platform by a plurality of transversely spaced independently vertically adjustable arms that permit different areas of the cutter bar to adjust independently of the other areas so that the cutter bar is free to follow the contour of the ground. A transverse rockshaft is journaled on the platform rearwardly of the cutter bar and has a plurality of radial feeler arms that engage the respective cutter bar mounting arms, so that as the mounting arms swing upwardly, the rockshaft rotates to a position that corresponds to the uppermost arm. One end of the rockshaft is connected by a suitable linkage to the movable element of an indicator at the side of the platform to give the operator a visual indication of the position of the uppermost area of the cutter bar.

4 Claims, 4 Drawing Figures

INDICATOR FOR A HARVESTING PLATFORM

BACKGROUND OF THE INVENTION

This invention relates to a harvesting platform for an agricultural harvesting machine, such as a self-propelled combine and more particularly to a harvesting platform having a plurality of transversely spaced independently vertically adjustable areas on the platform, such as a flexible cutter bar or a platform with a plurality of independently vertically adjustable row units. U.S. Pat. No. 3,698,164 and U.S. Pat. application Ser. No. 523,509, also assigned to the assignee herein, are examples of flexible cutter bars, while U.S. Pat. No. 3,808,783, also assigned to the assignee herein, is an example of a platform with vertically adjustable row units. In the latter type machine, the row units are free to float independently of one another within a limited degree so that the row units follow the contour of the ground, while in the flexible cutter bars, the cutter bar is free to flex to a limited degree and the cutter bar is mounted on the platform by means of a number of transversely spaced mounting means that permit different areas of the cutter bar to adjust vertically relative to the adjacent areas, whereby the cutter bar follows the contour of the ground.

As is well known, the harvesting platforms are conventionally carried at the forward end of the vertically adjustable feeder house, the height of the feeder house and consequently of the platform being controlled by hydraulic cylinders operative between the feeder house and the main frame of the combine, the extension of the hydraulic cylinder normally being controlled by valving at the operator station. The flexible cutter bars and machines with vertically adjustable row units are designed so that the crop is harvested as close to the ground as possible, such platforms being particularly advantageous when used in harvesting soybeans or the like, and normally the operator positions the platform so that the row units or the flexible cutter bar rides along the ground, the flexibility or independent vertical adjustment allowing the harvesting elements to follow the contour of the ground. Normally the platform is positioned by the operator so that the harvesting elements are somewhere in the mid range of their vertical adjustment, so that the individual elements are free to move both upwardly and downwardly. Typically, the range of adjustment is approximately four inches, and during operation, it is normally necessary for the operator to frequently adjust the height of the platform to maintain the platform in its optimum position for vertical adjustment of the harvesting elements.

It is known to provide automatic control systems responsive to ground engaging feelers for controlling the hydraulic cylinders that establish the position of the platform to maintain the optimum position of the platform, and it is also known to provide an automatic height control system for a platform utilizing a flexible cutter bar, such as shown in U.S. Pat. No. 3,698,164. However, such automatic control systems are expensive and, depending on the sensitivity of the system, the automatic control systems produce frequent adjustments to the platform height, the constant hunting of the platform for the optimum height being unnecessary and irritating to the operator.

SUMMARY OF THE INVENTION

According to the present invention, an indicator system is provided for indicating to the combine operator the position of the uppermost harvesting element, so that the operator can selectively adjust the platform height by manual adjustment of the platform cylinder control valve. Thus the indicator allows the operator to manually accomplish the same thing that an automatic control system accomplishes, without the added expense of an automatic control system. Also, the indicator allows the operator to set the platform to allow for differing amounts of upward or downward adjustment of the harvesting elements on the go, and further allows the operator to control the frequency of adjustment, the sensitivity of the system being at the discretion of the operator.

More specifically, the improved indicator system features a number of transversely spaced radial feeler arms mounted on a transverse rockshaft and engageable with the individual vertically adjustable harvesting elements, so that the position of the rockshaft is responsive to the uppermost harvesting element, the rockshaft being connected by suitable linkage to a visual indicator at the side of the platform. An important feature of the invention resides in the provision of adjustment means in the linkage so that the indicator can be adjusted or calibrated relative to the rockshaft.

Still another feature of the invention resides in the provision of a simple, rugged, easy to use and install indicator system, wherein the sensing mechanism for the indicator system can also be optionally utilized as the input for an automatic control system.

DESCRIPTION OF THE PREFERRED EMBODIMENT

Figure 1:
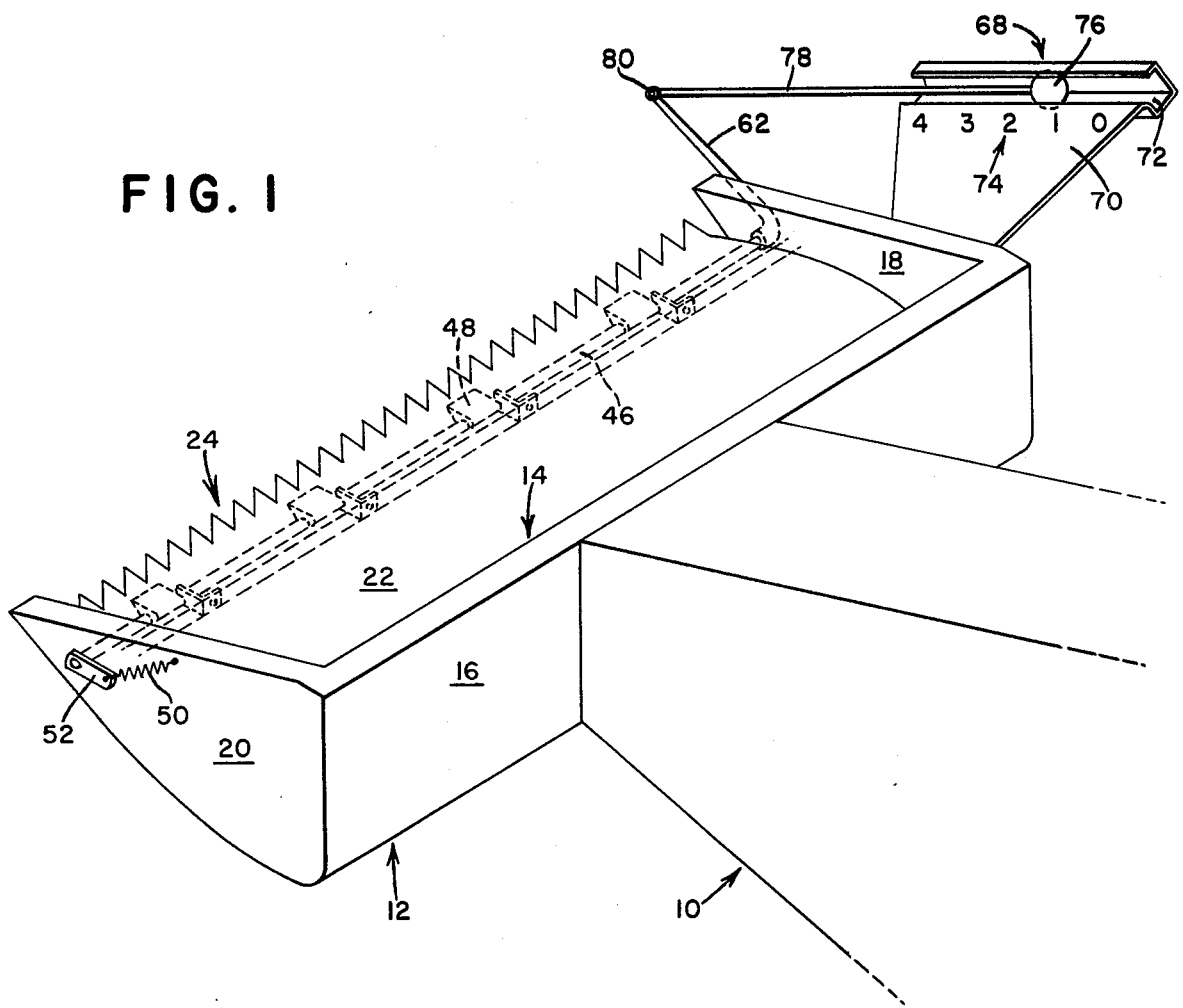
FIG. 1 is an upper rear, schematic, perspective view of a flexible cutter bar type harvesting platform embodying the invention.

The invention is embodied in a self-propelled combine, only the feeder house portion 10 of which is shown in FIG. 1. As is well known, the feeder house 10 is vertically adjustable about a transverse pivot by means of a pair of hydraulic cylinders operative between the main combine body and the feeder house, the cylinders being controlled by a control valve that is manually actuatable by the operator from an elevated operator's station at the forward end of the combine, the operator's station of many combines being at the front, left corner of the main combine body. The above general combine construction is shown in greater detail in U.S. Pat. No. 3,786,891 and 3,780,851, both of which are assigned to the assignee here. A transversely elongated harvesting platform, indicated generally by the numeral 12, is schematically illustrated in FIG. 1 and mounted on the forward end of the feeder house for vertical adjustment therewith. The platform 12 includes a rigid frame 14 having an upright rear wall 16 with a discharge opening in registry with the open front end of the feeder house 10. The platform frame also includes right and left upright, fore and aft side walls 18 and 20 and a floor 22 spanning the width of the combine between the opposite side walls forwardly of the rear wall. A grain harvesting platform, such as is schematically illustrated, conventionally includes a crop converging auger (not shown) immediately in front of the rear wall and above the floor and a reel (also not shown) that also spans the width of the platform forwardly of the auger.

A cutter bar assembly 24 spans the width of the platform along the leading edge of the floor 22, below the reel and forwardly of the auger. The cutter bar assembly includes a flexible, cutter bar 26, that flexes to a limited degree to follow the contour of the ground, as previously described. The cutter bar assembly includes a plurality of fore and aft skids 28 mounted behind the cutter bar and slidable along the ground when the cutter bar is being operated as close to the ground as possible. The detailed construction of the cutter bar assembly 24 is described in greater detail in U.S. patent applicaton Ser. No. 523,509 also assigned to the assignee herein.

Figure 2:
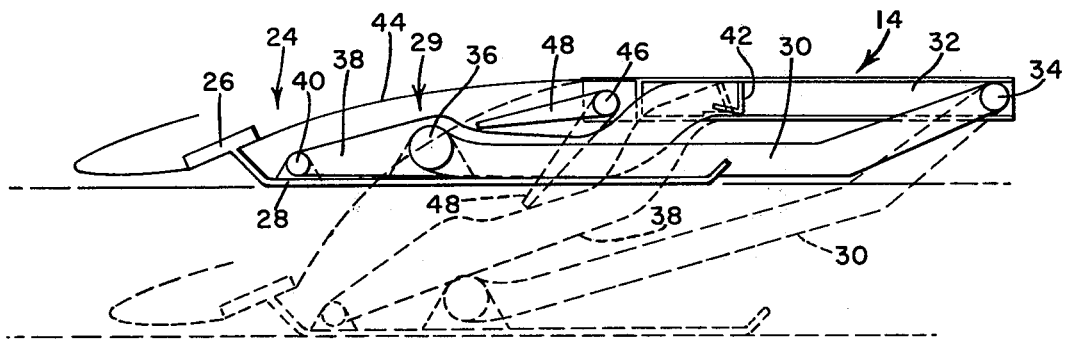
FIG. 2 is a schematic side elevation view of the flexible cutter bar and the means for mounting the bar on the platform, the cutter bar being shown in its uppermost position in solid lines and in its lowermost position in dotted lines.

The cutter bar assembly 24 also includes a plurality of transversely spaced mounting means 29 that connects the cutter bar assembly to the platform frame 14 to allow independent vertical adjustment of the adjacent areas or sections of the cutter bar assembly. Each mounting means includes a fore and aft push link 30 pivotally connected at its rearward end to a fore and aft support member 32 by means of a transverse rear pivot 34, the support member being connected to the underside of the platform floor 22. The forward end of the push link 30 is connected to the cutter bar skid 28 by means of a transverse front pivot 36. A stop arm 38, which lies in the same general vertical fore and aft plane as the push link 30, is pivotally connected to the cutter bar 26 by means of a transverse pivot 40 and has a rearward end rockable and slidable in the channel shaped support member 32. A stop mechanism 42 at the rearward end of the stop arm limits the downward swinging of the mounting means 29 relative to the platform frame by engagement with the support member 32 and the stop arm is engageable with the support member to limit the upward swinging of the mounting means. As shown in FIG. 2, the stop arm 38 and the push link 30 form two generally parallel elements of a parallelogram linkage that permits vertical adjustment of the cutter bar 26 relative to the platform frame.

A flexible pan or sealing element 44 has its forward end connected to the cutter bar and its rearward end connected to the forward end of the floor and spans the width of the platform to cover the gap between the cutter bar and the forward end of the floor. The pan deflects as the cutter bar assembly drops and exerts an upward biasing force on the cutter bar to partially counterbalance the weight of the cutter bar.

A transverse rockshaft 46 spans the width of the platform and is journaled in the platform frame 14 at the forward end of the support members 32 below the forward end of the floor 22. A plurality of radial feeler or sensor members 48 are rigidly attached to the rockshaft 46 and extend forwardly therefrom, the feeler members 48 being spaced the same distance apart as the mounting means 29 so that the respective feeler members 48 ride on top of the respective stop arms 38. A spring 50 operative between the left side of the platform and a radial arm 52 on the end of the rockshaft biases the rockshaft in a counterclockwise direction, as viewed from the left side of the machine, so that the feeler members 48 are biased downwardly against the stop arms. However, since the feeler members are rigid with the rockshaft, only the uppermost stop arm 38 will engage the feeler member, so that the rotational position of the rockshaft is responsive to the uppermost stop arm 38, the range of movement of the stop arms and consequently the range of movement on the feeler members and the rockshaft being shown in FIG. 2.

Figure 3:
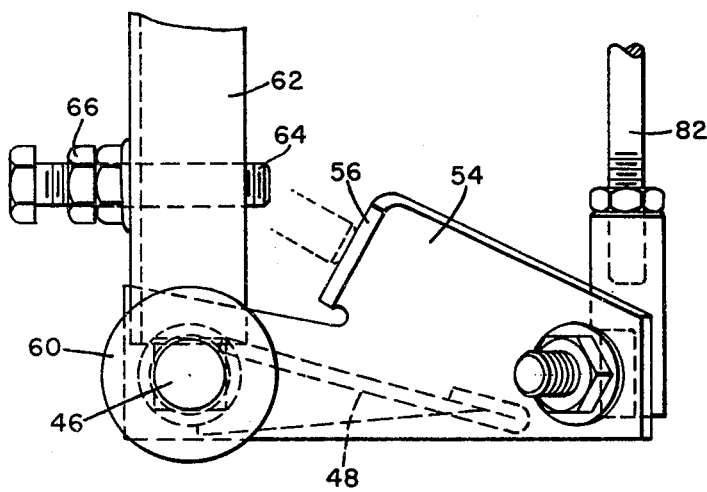
FIG. 3 is an enlarged side elevation view of the right end of the sensing rockshaft viewed from the right side of the platform.
Figure 4:
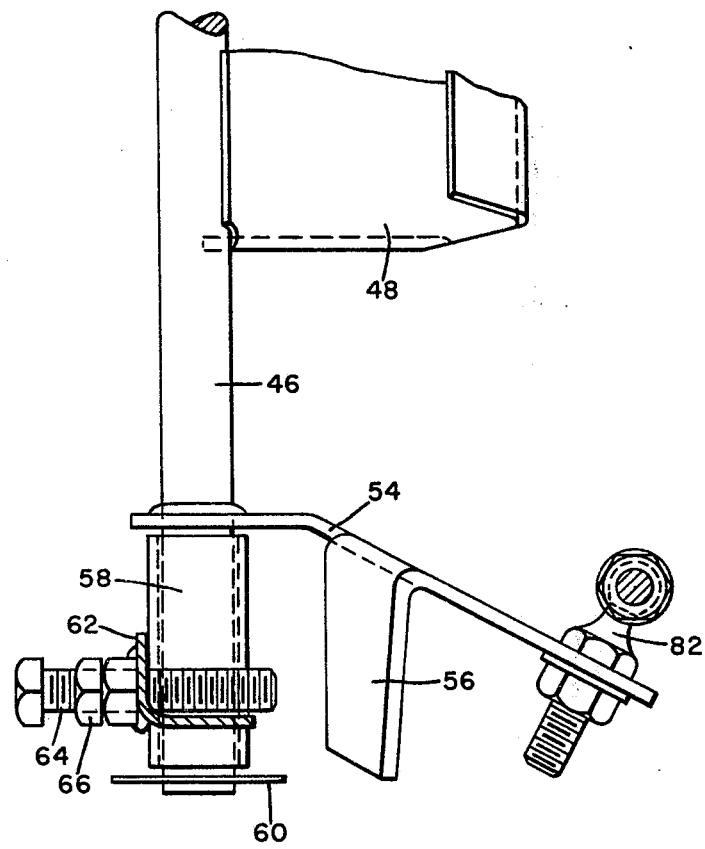
FIG. 4 is an enlarged plan view of the right end portion of the rockshaft shown in FIG. 3.

Attached to the right end of the rockshaft 46 is a radial bracket 54 that is disposed adjacent to the right platform side wall 18 and extends forwardly from the rockshaft. The bracket 54 includes a transverse abutment 56, and a cylindrical sleeve 58 is rotatably mounted on the rockshaft 46 adjacent to and outwardly of the bracket 54, the sleeve being retained on the end of the rockshaft by a retainer 60. A radial arm 62 is attached to and extends upwardly from the sleeve 58, and a generally fore and aft adjusting bolt 64 is threaded in the arm 62 and locked in position by a lock nut 66. Normally the arm 62 is swung forwardly so that the end of the adjusting bolt 64 engages the abutment 56 as shown in dotted lines in FIG. 3, whereby the arm 62 swings in a counterclockwise direction with the rockshaft 46. The arm 62 is thus normally inclined upwardly and forwardly from the rockshaft, and the weight of the arm maintains the adjusting bolt in contact with the abutment 56, although spring means can be provided to maintain the contact. As is apparent, by threading the bolt 64 in and out, the angular position of the arm 62 relative to the rockshaft 46 can be adjusted.

An indicator, indicated generally by the numeral 68, is mounted on the right side of the platform and includes an upright stationary element or plate 70 attached to the right side wall 18 and extending upwardly therefrom. The plate 70 includes a generally fore and aft channel 72 and has a scale or indicia 74 on the inner side of the plate 70 immediately below the channel 72, the indicia being clearly visible from the operator's platform. A ball or movable indicator element 76 is mounted in the channel 72 and is shiftable therealong, the movable indicator element 76 being connected to the upper forward end of the arm 62 by a fore and aft linkage rod 78 which is pivotally connected to the arm by a pivot 80.

A link 82 is optionally connectible to the forward end of the bracket 54 to connect the rockshaft to an automatic control system, as previously described, the automatic control system utilizing the same rockshaft and feelers as the visual indication system to sense the position of the uppermost area of the cutter bar.

In operation, the adjusting bolt 64 is adjusted so that the indicator element 76 is at the zero position on the scale 74 when the rockshaft is in its extreme clockwise position, as shown in full lines in FIG. 2. As previously described, this position is achieved when any one of the stop arms 38 is in its uppermost position. The distances in the linkage connecting the rockshaft to the indicator element 76 are such that, when such adjustment is made, the indicator element 76 is positioned adjacent the number 4 on the scale 74 when the rockshaft is in its counterclockwisemost position, as shown in dotted lines in FIG. 2 when all the stop arms are in their lowermost position. The scale corresponds to the number of inches of float, and if a cutter bar with six inches of float were provided, the scale 74 would read from 0 to 6. As is apparent, the position of the movable indicator element 76 relative to the scale 74 indicates to the operator the number of inches that the uppermost area of the cutter bar is away from the upper stop position.

Normally, the operator vertically locates the platform so that the indicator is somewhere in the middle of the two extremes, indicating that the cutter bar is free to float both upwardly and downwardly. If the indicator moves to the zero position, or is continually operating in the low end of the range, indicating that there is little or no upward float available in the cutter bar, the operator would normally raise the platform, and conversely, if the indicator is constantly at or near the 4 position, indicating that the cutter bar is substantially operating against the lower stop, the platform would be lowered. As previously described, with the aid of the indicator system, the operator can manually accomplish the same thing that an automatic control system provides, utilizing a much less expensive system, with the advantages that a manual system sometimes provides.

We claim:

1. In a mobile harvesting machine having a transversely elongated harvesting platform including a frame with opposite lateral sides and harvesting means mounted forwardly on the frame and including a plurality of generally fore and aft, transversely spaced mounting means connecting the harvesting means on the frame for independent vertical adjustment of sections of the harvesting means relative thereto within a limited range each mounting means including an independently vertically adjustable harvesting means element, the vertical position of which is responsive to the vertical position of the respective harvesting means section, and ground engaging means operatively connected to the respective harvesting means elements for vertically adjusting the harvesting means elements in response to changes in the contour of the ground, the combination therewith of an indicator system for indicating the position of the uppermost harvesting means element to a machine operator and comprising: a transverse rockshaft journaled on the frame and substantially extending between the opposite frame sides; a plurality of feeler members attached to and extending radially from the rockshaft and being respectively engageable with the uppermost of the harvesting means elements so that vertical adjustment of the uppermost harvesting means elements causing rotation of the rockshaft; a stationary indicator element mounted on the platform adjacent one of the platform sides; a movable indicator element mounted on the platform adjacent the stationary element for shifting movement relative thereto; and connecting means operatively connecting the rockshaft to the movable indicator element for shifting the movable indicator element relative to the stationary indicator element in response to rotation of the rockshaft, so that the position of the movable indicator element relative to the stationary indicator element is responsive to the position of the uppermost harvesting means element relative to the frame.

2. The invention defined in claim 1 wherein the connecting means includes a radial arm connected to one end of the rockshaft and linkage means connecting the radial arm to the movable indicator element.

3. The invention defined in claim 2 and including adjusting means operatively connecting the radial arm to the rockshaft for selectively adjusting the angular position of the arm relative to the rockshaft.

4. The invention defined in claim 1 wherein the harvesting machine includes means for automatically adjusting the vertical position of the platform frame in response to longitudinal shifting of a control link, and including a radial bracket rigidly connected to the rockshaft, the control link being connected to said bracket for longitudinal shifting of the control link in response to rocking of the rockshaft.

* * * * *